United States Patent [19]

Kutas

[11] Patent Number: 4,913,237

[45] Date of Patent: Apr. 3, 1990

[54] REMEDIAL TREATMENT FOR COAL DEGAS WELLS

[75] Inventor: G. Michael Kutas, Farmington, N. Mex.

[73] Assignee: Amoco Corporation, Chicago, Ill.

[21] Appl. No.: 310,440

[22] Filed: Feb. 14, 1989

[51] Int. Cl.$^4$ ................. E21B 37/00; E21B 43/26
[52] U.S. Cl. ................. 166/308; 166/305.1; 166/312; 166/371; 299/12
[58] Field of Search ............ 166/263, 305.1, 308, 166/309, 370, 371, 312; 299/12

[56] References Cited

U.S. PATENT DOCUMENTS

| | | | |
|---|---|---|---|
| 3,100,528 | 8/1963 | Plummer et al. | 166/308 X |
| 3,136,361 | 6/1964 | Marx | 166/308 |
| 3,412,797 | 11/1968 | Huitt et al. | 166/308 |
| 3,662,828 | 5/1972 | Hutchison | 166/312 |
| 3,937,283 | 2/1976 | Blauer et al. | 166/307 |
| 4,391,327 | 7/1983 | De Carlo | 166/308 X |
| 4,471,840 | 9/1984 | Lasseter et al. | 166/308 X |
| 4,679,630 | 7/1987 | Wyman | 166/308 X |

FOREIGN PATENT DOCUMENTS

| | | | |
|---|---|---|---|
| 1202882 | 4/1986 | Canada | 166/305.1 |
| 0609917 | 6/1978 | U.S.S.R. | 166/308 |

*Primary Examiner*—George A. Suchfield
*Attorney, Agent, or Firm*—Fred E. Hook; L. Wayne White

[57] ABSTRACT

A remedial treatment for coal degas wells is described which enhances the production flow of gas and/or water from the wells. The treatment comprises the steps of: (a) injecting an aqueous foam through the wellbore and into the coal seam(s) at a pump rate of about 10 to about 40 BPM; and (b) flowing back the well at the maximum rate through an open, unrestricted choke.

11 Claims, No Drawings

4,913,237

REMEDIAL TREATMENT FOR COAL DEGAS WELLS

BACKGROUND OF THE INVENTION

1. Field of the Invention:

This invention pertains to a remedial treatment of coal degas wells to enhance the production of gas and/or water from the wells. An aqueous foam is used as the well treatment fluid.

2. Description of the Prior Art:

Coal is the most abundant fossil energy resource in the world. Its recoverable reserves amount to almost 100 quintillion Btu of energy, nearly 15 times the total energy content estimated for known reserves of petroleum. *Petroleum Frontiers*, Vol. 3, No. 4, pages 2-3 (1986), published by Petroleum Information Corporation. People have mined coal and used it for heat for centuries. However, it is within the recent past that coal has been recognized for being the origin and source for another hydrocarbon fuel, i.e., coalbed methane. Coalbed gas consists primarily of methane (e.g., 95 percent) but may also contain ethane, propane and higher homologs. The volume of coalbed methane is estimated to be about 400 trillion standard cubic feet (SCF) of gas-in-place most of it adsorbed on coal seams buried at a depth of less than 9000 feet (ft) from the surface, and almost half of it is a coal seam buried less than 3000 ft. Too deep to mine but easily penetrated by a wellbore using conventional drilling techniques. Coalbeds are, therefore, reservoirs and source rocks for a huge amount of gas which can be produced, in part, through a wellbore. Methods of recovering the gas (i.e., coal degasification methods) are shown, for example, by U.S. Pat. Nos. 4,471,840, 4,391,327 and 4,301,875.

Much work has been done to capture the prize. The U.S. Department of Energy, the U.S. Bureau of Mines and the Gas Research Institute have funded a substantial amount of research on coal degasification, and the results have been published in the open literature. In addition, periodic coalbed methane symposiums are held at the University of Alabama, and elsewhere, and the results are published as symposium proceedings. Many of the journal articles describe stimulation techniques used by the industry to enhance production of gas. Conventional hydraulic fracturing techniques are the most common. In hydraulic fracturing, a fracture fluid (e.g., an aqueous gel or an aqueous foam) is injected through a wellbore and against the face of the formation at pump rates and pressure sufficient to fracture the formation. Typically, a proppant (e.g., 20/40 mesh sand, bauxite and the like) is blended with the fracture fluid and is carried by the fluid into the fracture. When the pump rate and pressure are released, the fractured formation settles back onto the emplaced proppant and a permeable communication channel is thereby established from the tip of the pack of proppant back to the wellbore. The formation fluids flow through this communication channel to the wellbore and are withdrawn. Unfortunately, coal fines are simultaneously carried towards the wellbore by the produced fluids and, occasionally, the communication channel is plugged by the coal fines. The plugging generally occurs at or near the wellbore. The plugging problem is addressed by the present invention.

SUMMARY OF THE INVENTION

A remedial treatment has now been discovered for enhancing the production of gas and/or water from a coal degasification well penetrating one or more coal seams in a subterranean formation. The novel treatment comprises the steps of:

(a) injecting an aqueous foam through the wellbore and into the coal seam(s) at a pump rate of about 10 to about 40 barrels per minute (BPM); and (b) flowing back the well at the maximum rate through an open choke.

The treatment is particularly effective in restoring production from coal degas wells that have propped fractures plugged with coal fines.

DETAILED DISCUSSION OF THE INVENTION

The well treatment fluid is an aqueous foam having a "foam quality" of at least about 50, and preferably from about 50 to about 75, and more preferably about 50. The foam quality is a measure of the volume of gas to the total volume of foam under downhole conditions. Such foams are well known in the oil and gas industry. They have been used as fracturing fluids and in well cleanout procedures. See, for example, U.S. Pat. No. 3,937,283; Canada Patent No. 1,185,778; U.S. Pat. Nos. 4,217,231; 3,486,560; 3,662,828; 3,700,034; 3,953,338 and other patents similarly classified which describes the foams, methods of preparation, and their use in fracturing and well clean out. The foams have an excellent capacity to carry suspended particulate matter.

The foams used in the present invention are comprised of an aqueous fluid, a foaming agent, and as gas. The aqueous fluid can contain a polymeric thickness (e.g., guar, hydroxypropylguar, xanthan gum, or the like), in which even the aqueous fluid is usually referred to as a gel. The polymeric thickness in the gels can be uncrosslinked or crosslinked. Many crosslinkers are known for use in aqueous foams, but the organometallic salts of titanium, zirconium and/or aluminum and the borates are the most widely used. In the present invention, the aqueous fluid is preferably water or a light brine. The foaming agent can be varied to convenience so long as it generates a suitably stable foam under conditions of use. The foaming agent can be nonionic, cationic, anionic, amphoteric or a blend thereof. The gas used to make the foam can also be varied to convenience, but is typically nitrogen or carbon dioxide because of their commercial availability and cost, and is preferably nitrogen. The foam is usually prepared on-the-fly by injecting the foaming agent into a pressurized flowing stream of the aqueous fluid, and thereafter injecting the gas into the resulting pressurized flowing stream of fluid. The turbulent flow generated by the gas entering the pressurized flowing stream of fluid and the turbulent flow of the resulting mixture through the wellbore is adequate to create the foam before it contacts the formation.

The foam, or the ingredients for the foam, are injected into the wellbore and into the formation at a pump rate of about 10 to about 40 barrels per minute (BPM), preferably from about 20 to about 40 BPM. Adequate pump pressure is used to force the foam into the formation treatment zone, The surface treatment pressure at the pumps will typically be in the range of from about 1000 to about 5000 psig but will vary with the well being treated. The volume of foam used in the treatment can be varied, but good results have been achieved using from about 3 to about 6 barrels of foam per foot of coal seam height in the zone to be treated.

The foam can be preceded in the treatment by a "pad fluid" to establish injectivity. The pad fluid can be a gas or an aqueous fluid. If the pad fluid is a gas, generally the gas used is the same as the gas chosen to generate the foam. If an aqueous fluid is used as the pad, typically it is the same as the aqueous fluid chosen for use in the foam.

The foam can be followed by a displacement fluid, such as water or a light brine. The use of a displacement fluid might enhance the economics of the treatment in some instances.

After the foam has been pumped into the formation, the well is flowed back as soon as practical and with a minimum of shut-in time. The flowback is with an open or full choke. Conventional techniques are used to discharge the pressurized fluids returned during the flowback. The well can be treated once or more than once as needed to clear the blockage.

Experimental

Several coal degas wells located in Colorado and New Mexico were successfully treated according to the present invention. The value of the treatment is shown by the increased production of gas and/or water after the treatment. The data from such treatments are summarized in Table I.

hydraulically fracturing the coal seam, said treatment comprising the steps of:
  (a) injecting an aqueous foam treating fluid through the wellbore and into the communication channel; and
  (b) flowing back the treating fluid through an open choke.

2. The treatment defined by claim 1 wherein said treating fluid has a foam quality of from about 50 to about 75 under downhole conditions of temperature and pressure.

3. The treatment defined by claim 1 wherein said treating fluid has a foam quality of about 50.

4. The treatment defined by claim 1 wherein said treating fluid is injected at a rate of from about 20 to about 40 BPM.

5. The treatment defined by claim 1 wherein said treating fluid is displaced from the well with water prior to flowing back the treating fluid.

6. The treatment defined by claim 1 wherein said treating fluid is preceded by a pad fluid to establish injectivity.

7. The treatment defined by claim 6 wherein the pad fluid is a gas.

8. The treatment defined by claim 7 wherein said gas is nitrogen.

9. The treatment defined by claim 6 wherein the pad fluid is an aqueous gel.

TABLE I

| Well No. | Ft of Perfs. | Foam Quality | Pump Rate (BPM) | Pressure (psig) | No. of Stages | Foam Injected (Bbls/stage) | Pretreatment | | Posttreatment | |
|---|---|---|---|---|---|---|---|---|---|---|
| | | | | | | | Gas Rate MCFD | Water Rate BWPD | Gas Rate MCFD | Water Rate BWPD |
| 1* | 25 | 50 | 40 | 4000 | 3 | 141 | 55 | 60 | 170 | 60 |
| 1* | 25 | 50 | 40 | 2500 | 3 | 135 | 170 | 60 | 330 | 63 |
| 2 | 22 | 50 | 40 | 5000 | 2 | 140 | 85 | 45 | 532 | 50 |
| 3 | 48 | 50 | 40 | 1800 | 2 | 242 | 0 | 35 | 50 | 50 |
| 4 | 54 | 50 | 40 | 2500 | 2 | 151 | 50 | 50 | 118 | 105 |
| 5 | 41 | 50 | 40 | — | 2 | 122 | 90 | 1500 | 218 | 1800 |
| 6 | 48 | 50 | 20 | 3500 | 2 | 200 | 10 | 50 | 172 | 72 |
| 7 | 34 | 70 | 20 | 1900 | 2 | 150 | 60 | 10 | 85 | 60 |
| 8 | 38 | 50 | 10 | 1350 | 2 | 200 | 100 | 30 | 150 | 80 |

*Well No. 1 was treated a second time.
"BPM" means barrels per day.
"psig" means pounds per square inch gauge.
"Bbls" means barrels.
"MCFD" means thousand cubic feet per day.
"BWFD" means barrels of water per day.
The data in Table I show that the remedial treatment was effective in increasing the production of gas and/or water.

What is claimed is:

1. A remedial treatment for enhancing the production of gas and/or water from a coal degasification well penetrating one or more coal seams in a subterranean formation and having a communication channel extending from the well into at least one of the coal seams, wherein the communication channel was created by 10. The treatment defined by claim 9 wherein the pad fluid is an aqueous gel.

11. The treatment defined by claim 1 wherein said treating fluid is injected at a rate of from about 10 to about 40 BPM.

* * * * *

UNITED STATES PATENT AND TRADEMARK OFFICE
CERTIFICATE OF CORRECTION

PATENT NO. : 4,913,237

DATED : April 3, 1990

INVENTOR(S) : G. Michael Kutas

It is certified that error appears in the above--identified patent and that said Letters Patent is hereby corrected as shown below:

Claim 9, line 2, "gel" should read --fluid--.

Signed and Sealed this

Seventh Day of January, 1992

*Attest:*

HARRY F. MANBECK, JR.

*Attesting Officer*     *Commissioner of Patents and Trademarks*